INVENTOR.
ROBERT H. THORNER

United States Patent Office 3,348,625
Patented Oct. 24, 1967

3,348,625
VEHICLE SPEED REGULATOR DEVICE
Robert H. Thorner, 8750–F W. Chicago Blvd.,
Detroit, Mich. 48204
Original application Jan. 16, 1961, Ser. No. 82,769, now
Patent No. 3,213,691, dated Oct. 26, 1965. Divided and
this application Oct. 20, 1965, Ser. No. 498,430
26 Claims. (Cl. 180—108)

The present application relates to the same subject matter as described in my application Ser. No. 683,318, filed Sept. 11, 1957, entitled, "Fluid Pressure Sensing Governor" (now Patent No. 3,084,758); Ser. No. 712,-847, filed Feb. 3, 1958 (now Patent No. 3,114,427), entitled, "Control Apparatus for Motor Vehicle Regulator"; Ser. No. 815,177, filed May 22, 1959, entitled, "Speed-Regulating Mechanism" (now Patent No. 3,068,-849) and Ser. No. 74,315, filed Dec. 7, 1960 (now Patent No. 3,153,325), entitled "Speed Regulating Device," and is a division of my application Ser. No. 82,769, filed Jan. 16, 1961, entitled, "Speed Regulator Device," now Patent No. 3,213,691, which is a continuation-in-part of Ser. No. 74,315, filed Dec. 7, 1960 (now Patent No. 3,153,325).

The present invention relates primarily but not necessarily to speed regulators for automotive engines, and is particularly directed to a novel fluid servo-mechanism, novel sensing means thereof, and novel control means therefor.

In regulators having a fluid servo-motor controlled by a pilot valve, such as speed regulators, the elimination of undesirable fluid static and dynamic forces acting on the valve has always been a puzzling problem. This problem is significant in modulating-type pilot valve structures, and is most severe in the environment of the single-acting type servo-motor. When a "closed-loop" regulator is responsive to a controlled condition, it is usually desirable for the pilot valve to respond to changes in the controlled condition substantially independent of static and fluid dynamic forces acting on the valve.

The disturbing or unbalancing fluid forces acting on a pilot valve, as above discussed, are produced by at least two basic factors. One important factor is the variation in the source pressure acting on the pilot valve, when such variation is significant in relation to the sensing or signal forces which actuate the pilot valve. Another factor, for a constant value of the source pressure, comprises the two fluid force variations acting on the pilot valve as the valve travels throughout its operating range; one of these fluid force variations comprises the changes in force produced by the static pressure acting on the uncompensated but varying effective area of the pilot valve which is exposed to the source pressure; the second of these force variations is the fluid dynamic (Bernoulli) effect produced on the pilot valve by the changing velocity of the controlled fluid as the valve changes its travel-position.

In my co-pending application, Ser. No. 815,177, two means are disclosed to compensate for the above described unbalancing forces; one means provides a disc to oppose and cancel the unbalance forces of the pilot valve; and the second means provides a pressure regulator to control the fluid pressure before it reaches the pilot valve. While these means are very effective, they do require some additional mechanism, particularly the pressure regulator type. Also, in the regulator of the aforesaid co-pending application, the pilot valve varies simultaneously the apertures of the inlet and outlet orifices of the single-acting pressure (vacuum) chamber of the servo-motor. This, of course, is highly desirable because the complete range of fluid pressure is available to the servo-motor with a very fast change of pressure for a given pilot valve travel.

However, in certain regulator applications, such as for an automotive speed regulator in turnpike driving, reduction of cost is highly critical in order for such devices to gain wide public acceptance. Such desirable reduction of cost can best be achieved by inherent simplification of the mechanism, which may be justified even at some compromise in performance from that produced by the structures disclosed in my said co-pending application.

A principal object of the present invention is to provide a fluid servo-type regulating device, such as a speed regulator including a pilot valve, arranged to be unaffected by undesirable variations in source pressure and of very simple principle to facilitate low cost construction.

Another object of the present invention is to provide a simple speed regulator for an internal combustion engine, in which the intake manifold vacuum varies as a function of the movement of a throttle, arranged to be unaffected by said undesirable variation in manifold vacuum and to utilized throttle movement or load changes to provide desirable speed droop control, and which arrangement provides unusual stability manifested as very smooth operation.

A further object of the present invention is to provide in cooperation with a speed regulating device for automotive highway driving, particularly of the type mentioned in the preceding paragraph, novel means to control the operation of the device in so simple a manner as to extend the use thereof to city and boulevard driving as well as for highway driving.

These and other objects which will appear more clearly as the specification proceeds, are accomplished according to the present invention, by the arrangement and combination of elements set forth in the following detailed description, defined in the appended claims and illustratively exemplified in the accompanying drawings, in which:

Figures 1, 2, 3:
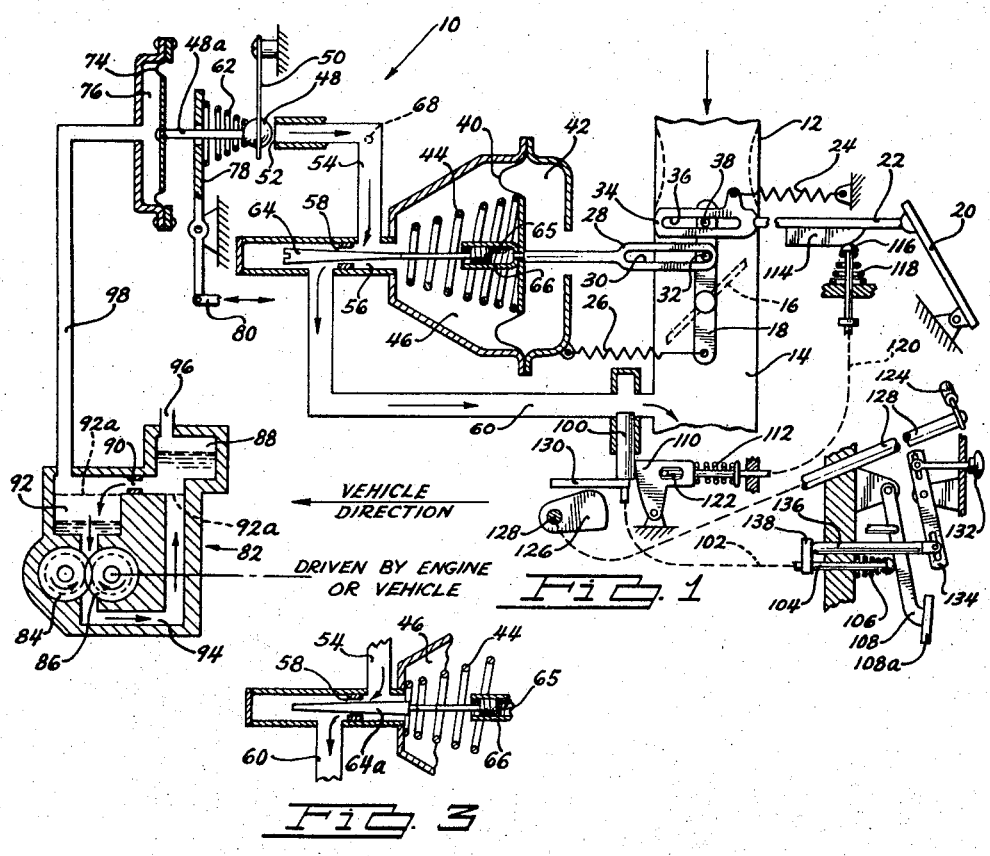
FIG. 1 is a schematic view of one form of speed regulator embodying the present invention operatively related to a carburetor and engine manifold or intake, as would be applied as a speed regulator for an automotive vehicle, and disclosing the novel control system therefor.
FIG. 2 is a modified form of the control system for the speed regulator shown in FIG. 1.
FIG. 3 is a fragmentary view of a modification of a throttle-operated valve in the air circuit of FIG. 1.

In accordance with the broader concept of the invention I provide a regulator capable of very low-cost manufacture due to its simple construction and which is responsive to a controlled condition such as speed. In the forms shown, the regulator controls the speed of an automotive vehicle including an engine with an intake passage having a throttle therein. The regulator includes a single-acting spring-biased servo-motor with inlet and outlet restrictions to the pressure (or vacuum) side thereof, one of the restrictions being exposed to a source of varying pressure which comprises a source of energy. I provide in cooperation only with the other restriction (not exposed to the source pressure) a modulating-type pilot means such as a pilot valve to control the pressure between the restrictions, so that in this arrangement the pilot valve is not subject to source pressure. The restriction which is exposed to the varying source pressure may be fixed or alternately may be provided with a "re-set" valve operated by or responsive to changes in the position of the throttle, depending on the application of the device. For frictionless response I provide in the inventive combination leaf-spring means to support the pilot valve, which valve may be operated by any means to provide forces varying as a function of the controlled-condition such as speed.

In the application of the present invention as an automatic throttle for turnpike driving, I provide control means operable only when the vehicle is in operation, such as by the transmission selector lever, to enable the device to be initially activated by the driver. In the form shown, such control means includes a valve in the source pressure line to shut off or open the source pressure to the regulator and also includes means (preferably mechanically operated as much as possible) to instantly release the device upon any application of the brake pedal; and as part of the control means I further provide means operated as a function of movement of the accelerator pedal (or the throttle including any connecting linkage) to automatically re-activate the regulator device after a partial travel of the accelerator. In the forms shown, such last-named means comprise a flexible shaft linkage to the release means mechanically operated by the accelerator; or such means may comprise a diaphragm exposed to manifold vacuum to activate the release means after the throttle opens to reduce the manifold vacuum sufficiently, and the vehicle is then automatically accelerated to the regulated speed. In such control system, the device is automatically inactivated when the vehicle is not in operation and is rendered ready to be activated by the driver each time he initially activates the vehicle, and thereafter the device is automatically activated upon a selective partial travel of the accelerator following each inactivation of the device by normal operation of the brake pedal.

Referring to FIG. 1, a speed regulator 10 for an automotive vehicle is shown to illustrate the concepts of the present invention. In FIG. 1 there is shown a conventional carburetor 12 in an engine intake passage or manifold 14 and including a throttle 16 with a lever 18, operated by an accelerator 20 through a linkage 22, all biased in the idle speed direction by an idle spring 24 and a lever spring 26, to be discussed hereinafter. The lever 18 and throttle 16 are operated by the regulator by a first lost-motion means such as an override member 28 having a slot 30 cooperating with a pin 32 carried by lever 18. The accelerator linkage engages lever 18 by means of a second lost-motion means such as an override member 34 having a slot 36 cooperating with a pin 38 carried by lever 18.

The override member 28 is actuated by a servo-motor which in the example shown comprises a pressure responsive member, such as a diaphragm 40 having atmospheric pressure on one side thereof in chamber 42 and vacuum on the other side thereof in chamber 46. The vacuum-derived force of diaphragm 40 is biased or opposed by a spring 44 which tends to close throttle 16 when the regulator is in operation. The vacuum in chamber 46 acting on diaphragm 40 is modulated by pilot means which in the form shown comprises a pilot valve 48 supported for frictionless movements at one end of a leaf spring member 50, which leaf member is rigidly mounted at its other end to a fixed portion of the vehicle by suitable means. The pilot valve controls a fluid circuit or passage means in which air flows through an inlet orifice or restriction 52, a conduit or passage 54 which is in open communication with chamber 46 through a branch conduit 56, then through an outlet orifice or restriction 58, and out through a conduit 60 to the intake manifold 14.

The pilot valve 48 may assume any suitable contour, but in the form shown, a ball valve is held in alignment by leaf spring 50 and is biased in a clothing direction by a speeder-spring 62 to cooperate with restriction 52 to vary the aperture thereof. The pressure (vacuum) in passage 54 between the two restrictions 52 and 58 is transmitted to diaphragm 40. A variable tapered "re- set" valve 64 is shown operatively connected to diaphragm 40 and throttle 16 to vary the aperture of restriction 58 as a function of the position of the throttle. The valve 64 optionally may include a threaded portion 65 cooperating with a threaded cup-member 66 suitably secured to diaphragm 40. Rotation of valve 64 at the slotted end changes its relationship with the throttle 16, to provide speed-droop control. The valve 64 may or may not be provided depending on the application of the control device.

When the pilot valve 48 is held closed by spring 62, substantially the full manifold vacuum exists in conduit 54 and chamber 46. When the pilot valve progressively is moved from its seated position to its full open position, by means to be discussed, the vacuum in conduit 54 and chamber 46 is modulated and gradually reduces to substantially the atmospheric pressure. The maximum diaphragm vacuum obtainable in chamber 46 during regulator operation, such as 5 to 7 inches of mercury for example, is established when the diaphragm 40 overpowers the force of spring 44 to open throttle 16 until the vacuum reduces enough to enable the force of diaphragm 40 to balance the spring. For the same reason, the minimum manifold vacuum obtainable during regulator operation is substantially the same as this maximum diaphragm vacuum. As valve 48 gradually opens to increase pressure (reduce the vacuum) in chamber 46, diaphragm 40 is gradually moved to the right by spring 44 as a function of the travel of valve 48 to the left.

A sensing diaphragm 74 provides forces acting on the pilot valve in response to vacuum in chamber 76 varying as a function of vehicle (or engine) speed in a manner to be described. The forces of diaphragm 74 are opposed and balanced by spring 62 which is manually adjusted by an arm 78 operated by suitable shaft means 80, such as a flexible shaft controlled by the operator at the instrument panel (not shown).

A signal unit or pressure generator unit, shown by way of illustration, is generally indicated by the numeral 82 and produces the pressure in chamber 76 which varies as a function of speed in this instance. This pressure generator has been thoroughly discussed in my said co-pending applications, Ser. Nos. 74,315 and 82,769, so that a detailed discussion is not necessary herein. Briefly, when the power driven gears 84 and 86 rotate, oil is pumped through passage 94, through reservoir 88, through restriction 90 into the pressure-transmitter chamber 92. As the speed gradually increases, the liquid level starts from rest at 92a and gradually lowers in chamber 92 while the liquid level rises in chamber 88; at the same time, vacuum is produced on the air in passage 98, which vacuum varies as a function of vehicle (or engine) speed.

The speed-regulating action of the mechanism described thus far is as follows: When the rotary speed of the vehicle and gears 84 and 86 increases which increases the vacuum in chamber 76, diaphragm 74 pulls the pilot valve 48 to the left against spring 62 to open the restriction 52 gradually as the speed increases. This action decreases the vacuum in chamber 46 in a manner previously described, so that spring 44 expands which enables spring 26 to move throttle 16 in a closing direction tending to restore the regulated speed. When the vehicle (or engine) speed decreases, the regulating action is the reverse of that above described.

The diaphragm and spring 44 are selected to hold the throttle at its maximum opening at the highest practical diaphragm vacuum such as 5–7 inches of mercury in conduit 54 and chamber 46. As previously described, the necessary diaphragm vacuum is determined by the force of spring 44 and the size of diaphragm 40. It is desired to use as high a diaphragm vacuum as possible in order to provide sufficient force to operate the throttle and any associated linkage; however as the manifold vacuum tends to fall below this value (as when ascending steep hills)

the throttle gradually closes to maintain this vacuum so that the desired regulated speed cannot be maintained. Thus the maximum diaphragm vacuum must be chosen to compromise these two opposing factors. As the valve 48 opens, the diaphragm vacuum gradually reduces from its maximum as above noted to an amount which enables spring 44 to close throttle 16, such as to 2–3 inches of mercury, for example.

It can be seen that valve 48 is exposed only to this mildly-varying diaphragm vacuum in conduit 54 and not to the severely-varying manifold vacuum in conduit 60, which is restricted at orifice 58. This diaphragm vacuum acting on the pilot valve provides a mild "re-set" action tending to reduce the speed-droop from that which normally would be produced if the pilot valve were completely balanced aerodynamically and statically. In FIG. 1, as valve 48 is opened and the vacuum in conduit 54 reduces, as explained, the vacuum-unbalance force urging valve 48 to the right gradually reduces as the throttle closes. Such reduction in vacuum force acting on valve 48 enables it to be positioned or "re-set" progressively more to the left as the throttle closes than its corresponding positions would be if the pilot valve were completely air balanced. Such re-positioning of the pilot valve progressively to the left effects slightly more throttle closure than with a balanced valve, which in turn reduces the speed-droop. This mild "re-set" or speed-droop control can be varied somewhat in the design of various constant factors such as the area of orifice 52, the area of diaphragm 74, the rate of spring 62, etc.

The particular form of regulator device shown in FIG. 1 has further utility in cooperation with an internal combustion engine having throttle-varying manifold vacuum to produce unusually stable regulation. Such stability is achieved because of the single-acting servo-motor biased in a closing direction by a spring 26 and spring 44 and biased in an opening direction by a controlled portion of manifold vacuum. In FIG. 1, consider the stabilizing action of these elements with orifice 58 comprising a fixed restriction without re-set valve 64, as described thus far. While the regulator mechanism is in operation, for any fixed or instantaneous position of pilot valve 48 (considering the pilot valve movement as a series of instantaneous fixed positions), if the throttle 16 suddenly moves slightly open for any reason, the vacuum in passage 60 reduces slightly. This action causes the vacuum in passage 54 and chamber 46 to reduce correspondingly so that spring 44 expands which enables spring 26 to move the throttle in a closing direction until the diaphragm vacuum and manifold vacuum are restored to their original values. Conversely, if the throttle suddenly closes slightly for any reason, with the pilot valve in a fixed position at any given instant, the vacuum in passage 60 increases which effects a corresponding but lesser increase in vacuum in chamber 46, which causes the throttle to open until substantially the original values of diaphragm and manifold vacuum are restored. In this manner the device acts as a pressure regulator in which the servo-motor maintains the throttle in a position to maintain substantially constant values of diaphragm and manifold vacuum for any instantaneous position of the pilot valve; and when the pilot valve assumes another position, the throttle automatically maintains another value of manifold vacuum. This type of operation is extremely smooth with a very "solid" stability since it rapidly restores the throttle position at all times at each travel-position of the pilot valve.

In my co-pending application, Ser. No. 815,177, the pilot valve modulates simultaneously both the inlet and outlet orifices to control vacuum to the servo-motor. This double-valve control, of course, is highly desirable because it provides a larger range or change of vacuum for a given travel of the pilot valve. While the pilot valve control system of the present invention lends itself to lower cost manufacture, the valve 64 may optionally be provided to approach the effect of the two-valve pilot-valve of this co-pending application, and also for speed-droop control. For example, when the regulator device is stable and the speed increases, the pilot valve 48 opens to lower the vacuum in chamber 46 which reduces the throttle-opening and moves valve 64 to the right, thereby slightly increasing the restrictive effect of orifice 58. This action reduces the vacuum in conduit 54 and chamber 46 more than if the re-set were not used so that spring 44 moves the throttle slightly more closed. In this manner, a larger change in diaphragm vacuum and hence a larger travel of throttle 16 is provided for a given travel of pilot valve 48. For the stability action above-described, it is desirable for the vacuum in chamber 46 to increase correspondingly when the manifold vacuum increases at fixed or instantaneous positions of the pilot valve. This result can be controlled by the rate of change of valve 64. The valve and its re-set action as above-described can help provide the desired speed-droop by proper calibration of its contour.

The inherent slower action of the simplified system of the present invention can be further improved by the double abutment lost-motion or override mechanism comprising elements 28, 30, 32, 34, 36, 38. This mechanism enables the use of a smaller diaphragm 40 since the diaphragm must only operate lever 18 and throttle 16 in its regulating action. The diaphragm 40 does not operate the accelerator 20 and its linkage 22 with its undesirable friction; and the reduced air displacement of diaphragm 40 enables a faster action thereof for a given travel of pilot valve 48.

Automatic throttle devices now in use are so arranged that the vehicle must actually attain the set speed before the regulating mechanism can be activated or engaged. These present devices would tend to accelerate the vehicle much too rapidly if means were provided to enable automatic activation or engagement *before* the vehicle attains the set speed. Such devices, if capable of wide-open-throttle governing, would accelerate the vehicle at or near wide-open-throttle from the activated speed to the set speed, and the "roar" of the engine accompanying such fast acceleration can dangerously startle the operator. It would be highly desirable for the speed regulating device to provide sufficiently slow acceleration that it can be safely activated at any speed below the set speed; this arrangement would cause the vehicle automatically to accelerate slowly or moderately from the activated speed to the set speed. It would be particularly desirable to cause the automatic activation or engagement after a partial travel of the throttle or accelerator so that the control device cannot be activated when the engine is idling. Then after the vehicle attains a partial speed or the throttle is consciously opened partially, the regulator device engages and automatically accelerates the vehicle slowly to the set speed. This control system is more desirable than present control systems because (1) the operator does not have to wait until the set speed is attained each of the many times the device must be engaged in normal driving and (2) it is unnecessary to rely on a "push-back" force or other signals of sound or sight to indicate when the operator can remove his foot from the accelerator. This is true because after the operator "feels" the device start to accelerate automatically, he can move his foot and the vehicle will automatically seek out and stop accelerating at exactly the set speed in each of the many times the device must be engaged in normal driving. In actual tests I have found that these two advantages greatly expand the use of these speed regulators to include city driving (on main streets and boulevards) as well as for highway driving.

Such desirable control system is disclosed in the present invention. In FIG. 1, for this purpose, as explained previously, the spring 44 is selected so that the diaphragm vacuum in chamber 46 is never more than a pre-selected value, such as 5–7 inches of mercury for example, which is a minimum for the manifold vacuum. The throttles opening at the minimum manifold vacuum corresponding to this maximum diaphragm vacuum restricts the acceleration rate sufficiently to enable safe automatic acceleration. The acceleration can be further affected by mounting the pressure generator unit in the vehicle, as shown in FIG. 1 (see arrow indicating vehicle direction), such that the reservoir chamber 88 is located toward the rear of the vehicle and the pressure converter chamber 92 is located toward the front. Then when the vehicle accelerates (to the left) the liquid pressure at the entrance of orifice 90 is slightly reduced by inertia forces of the liquid in chamber 88. This liquid-inertia effect tends to slightly increase the vacuum in chambers 92 and 76 over that normally produced without acceleration. Accordingly, the pilot valve 48 is open slightly more than normal so that throttle 16 is closed slightly more than without acceleration, thereby affecting the acceleration.

In order to utilize the foregoing manifold vacuum method of the present invention, in which moderate acceleration is effected, control means for the regulator device are provided to enable automatic acceleration after a partial travel of the accelerator; such control means also includes means to release the regulator at least upon all brake actuations as well as by selective manual release, and also includes restraining means operable upon inactivation of the vehicle to automatically render the regulator device inoperative. In FIG. 1, by way of illustration, such control means comprises a valve member 100 adjustably movable vertically, as shown, to open or close the flow of air through conduit 60. Valve 100 is connected by a flexible shaft 102 to a plunger 104 biased by a spring 106 to abut the suspended brake pedal arm 108. As shown in FIG. 1, the regulator device is in operation since conduit 60 is open. Depression of the brake pedal 108a adjusts valve 100 to shut off vacuum to chamber 46 so that spring 44 expands which enables spring 26 to close throttle 16. A small orifice 68 may optionally be provided for enabling air to fill chamber 46 faster than by only the bleed past valve 48. When valve 100 moves up in FIG. 1, a detent 110 is biased leftwardly by a spring 112 under the valve to lock it in its closed position even after releasing pedal 108a. When accelerator 20 is depressed a predetermined amount, a cam 114 enables a follower 116 to be biased upwardly by a spring 118, which pulls detent 110 free of valve 100 through a flexible shaft 120 having lost-motion connection 122 with follower 116. Spring 106 then instantly adjusts valve 100 to open and transmit vacuum to diaphragm 40 for opening the throttle and providing automatic but moderate acceleration to the set speed as predetermined by the setting of spring 62. When the brake pedal 108a is again depressed the foregoing cycle is repeated.

Restraining means are provided herein to render the regulator mechanism inoperative as a result of the normal movement of an element of the vehicle incident to inactivation thereof. The restraining means illustrated in the form of my invention shown herein includes a transmission selector lever 124 and a cam 126 operated thereby through a shaft 128 to act on a cam follower plate 130 secured to valve 100 by suitable means. When the lever 124, which comprises the "element," is placed in at least "neutral" position and possibly "park" and "reverse" positions, cam 126 acts to close valve 100 and inactivate the regulator. In order to activate the regulator again, it is necessary to place the transmission lever in "drive" (or "high gear") position and depress the accelerator until detent 110 releases valve 100. Manual restraining or lock-out means is provided and comprises a release knob 132 to manually close valve 100, and open it while driving, through a lever 134 and a pin 136 acting on an arm 138 secured to plunger 104. Suitable friction means (not shown) maintains the release knob in any desired position. The regulator also may be rendered inoperative at any time by moving shaft 80 to release the force on spring 62.

FIG. 2 shows an alternate form of control system in which the shaft 120 is actuated by a diaphragm 140 exposed to the manifold vacuum in conduit 60 and biased to the right by a spring 142. When the engine is idling, the manifold vacuum moves diaphragm 140 and its shaft 120 to the left which enables spring 112 to move detent 110 to lock valve 100 when it closes conduit 60 as above described. When the throttle is opened enough to reduce the manifold vacuum to an amount enabling spring 142 to move diaphragm 140 and detent 110 to the right, the valve 100 is instantly opened by spring 106 (FIG. 1) and the vehicle then accelerates automatically to the speed predetermined by spring 62 as above-described. Hence, the throttle is temporarily and "selectively" advanced until the vacuum drops enough to cause activation automatically.

FIG. 3 shows a modification of the apparatus shown in FIG. 1 in that the re-set valve designated 64 of FIG. 1 is reversed in form and is shown as re-set valve 64a in FIG. 3. This alternate construction may be used in any regulator application in which it may be desired to provide a broader speed-droop than normally would be provided with only the restriction 58 (and without the valve 64a) and/or if a greater throttle-stabilizing action is desired. With this construction, when the valve 48 opens as the speed increases, diaphragm 40 reduces the opening of throttle 16. This action increases the opening of valve 64a which thereby increases the vacuum in chamber 46 more than without the valve 64a; this re-set effect retards further closing of the throttle so that the speed-droop would be increased. As used herein, and in the appended claims, the term "speed-droop" means the value or amount of speed variation as the load on the regulated engine changes throughout its operating load range.

Since vacuum is a sub-atmospheric pressure, when the term "pressure" is used in the claims it refers to either vacuum or pressure and is intended to include all forms of the invention disclosed herein.

When the terminology in the claims recite the principles disclosed herein in terms of engine speed, it should be understood that vehicle speed and engine speed are to be interpreted synonymously in construing the invention defined by these claims. This is true, particularly for so-called "automatic throttle" devices for constant road-speed operation, as shown in FIG. 1, since at higher cruising speeds, the slippage of an automatic transmission is very slight so that engine speed is very nearly proportional to road speed.

I wish it understood that my invention is not limited to any specific construction, arrangement or form of the parts, and is capable of numerous modifications and changes without departing from the spirit and the scope of the claims.

What I claim is:

1. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough and having inlet and outlet restrictions therein, said circuit communicating with said pressure responsive member on one side thereof at a point between said two restrictions and having its outlet communicating with said intake passage on the downstream side of said throttle, said inlet restriction comprising valve means including a movable valve portion to vary the restrictive effect of said inlet restriction for controlling said vacuum acting on said pressure responsive member to effect movements thereof, sensing means responsive to changes in the speed of said engine to produce forces acting on said valve portion for effecting speed-regulating movements of said pressure responsive member and cooperating throttle, and said outlet restriction comprising second valve means including a movable valve element operatively connected to said throttle to vary the restrictive effect of said outlet restriction in response to changes in the position of the throttle.

2. The combination of means defined in claim 1, and said engine being part of an automotive vehicle wherein said device regulates the speed of the vehicle, said vehicle having brake-actuating means, and said throttle being operable by the vehicle-driver in a manner in which speed is increased by advancing the throttle, and conversely, release means operated by said brake-actuating means upon normal movements thereof to temporarily inactivate said regulating device with respect to said throttle without rendering same inoperative, automatic activating means selectively operated only after advancing said throttle to automatically effect activation of said device with respect to said throttle, lost-motion means operatively connecting said pressure responsive member and said throttle, and speed selector means operatively associated with said first-named valve means for enabling said driver to select any desired operating speed of the vehicle.

3. The combination of means defined in claim 1, and said engine being part of an automotive vehicle wherein said device regulates the speed of the vehicle, said vehicle having brake-actuating means and including an element manually movable by the vehicle-driver incident to normal operation of the vehicle, and release means operated by said brake-actuating means upon normal movements thereof for temporarily rendering said regulator mechanism inactive but not inoperative to automatically operate said throttle, automatic activating means operatively associated with said device and including a pressure responsive member exposed to said intake passage vacuum and operable thereby to automatically activate the regulator device with respect to said throttle when said intake passage vacuum reduces to a predetermined value as a result of manual advancement of said throttle by the vehicle-driver, and restraining means operable in response to movements of said element for rendering said device inoperative.

4. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough and having inlet and outlet restrictions therein, said circuit communicating with said pressure responsive member on one side thereof at a point between said two restrictions and having its outlet communicating with said intake passage on the downstream side of said throttle, valve means in said circuit for controlling vacuum therein acting only on said one side of said pressure responsive member for effecting movements thereof in a direction to open said throttle, biasing means acting on said pressure responsive member in a direction tending to close said throttle to oppose the forces produced by said last-named vacuum, said inlet restriction comprising valve means including a movable valve portion to vary the restrictive effect of said inlet restriction for regulating said vacuum acting on said pressure responsive member to effect movements thereof, sensing means responsive to changes in the speed of said engine to produce forces acting on said valve means for effecting speed-regulating movements of said throttle, and said outlet restriction comprising second valve means including a movable valve element operatively connected to said throttle to control the restrictive effect of said outlet restriction as a function of the position of the throttle.

5. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough and having inlet and outlet restrictions therein, said circuit communicating with said pressure responsive member on one side thereof at a point between said two restrictions and having its outlet communicating with said intake passage on the downstream side of said throttle, said inlet restriction comprising valve means including a movable valve portion to vary the restrictive effect of said inlet restriction for controlling said vacuum acting on said pressure responsive member to effect movements thereof, sensing means responsive to changes in the speed of said engine to produce forces acting on said valve portion for effecting speed-regulating movements of said pressure responsive member and cooperating throttle, and said outlet restriction comprising second valve means including a movable valve element operatively connected to said throttle to reduce the aperture of said outlet restriction for increasing its restrictive effect as the throttle is moved in a closing direction, and conversely.

6. In a control device for regulating the speed of an engine having control means therefor, the combination of means to effect speed-regulating movements of said control means comprising, a pressure responsive member operatievly connected to said control means for actuation thereof, a fluid circuit having a source of fluid pressure for the flow of fluid therethrough and having inlet and outlet restrictions therein, said pressure responsive member communicating with said circuit at a point between said two restrictions, one of said restrictions comprising valve means to control the restrictive effect of said one restriction for establishing the pressure between said two restrictions acting on said pressure responsive member, biasing means acting on said pressure responsive member and said control means in a direction to oppose the forces produced by said last-named pressure, sensing means responsive to changes in the speed of said engine to produce forces acting on said valve means for effecting speed-regulating movements of said pressure responsive member and said control means, and said other restriction comprising second valve means operatively connected to said control means to control the restrictive effect of said other restriction as a function of the position of said control means.

7. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure responsive member operatively connected to said throttle for actuation thereof, a vacuum circuit for the flow of air therethrough and having inlet and outlet restrictions therein, said circuit communicating with said pressure responsive member on one side thereof at a point between said two restrictions and having its outlet communicating with said intake passage on the downstream side of said throttle, said inlet restriction comprising valve means including a movable valve portion to vary the restrictive effect of said inlet restriction for controlling said vacuum acting on said pressure responsive member to effect movements thereof, sensing means responsive to changes in the speed of said engine to produce forces acting on said valve portion for effecting speed-regulating movements of said pressure responsive member and cooperating throttle, and said outlet restriction comprising second valve means including a movable valve element operatively connected to said throttle to increase the aperture of said outlet restriction for decreasing its restrictive effect as the throttle is moved in a closing direction, and conversely.

8. In a control valve device for regulating the speed of a rotating machine having control means therefor, the combination of means to effect speed-regulating movements of said control means comprising, a pressure responsive member operatively connected to said control means for actuation thereof, a fluid circuit having a source of fluid pressure for the flow of fluid therethrough and having inlet and outlet restrictions therein, said pressure responsive member communicating with said circuit at a point between said two restrictions, one of said restrictions comprising valve means including a movable valve portion to control the restrictive effect of said one restriction for establishing the pressure between said two restrictions acting on said pressure responsive member, sensing means responsive to changes in the speed of said machine to produce forces acting on said valve portion for effecting speed-regulating movements of said pressure responsive member and said control means, and said other restriction including second valve means operatively connected to said control means to increase the restrictive effect of said other restriction as said control means moves in a reduce-speed direction, and conversely.

9. In a control device for regulating the speed of a rotating machine having control means therefor, the combination of means to effect speed-regulating movements of said control means comprising, a pressure responsive member operatively connected to said control means for actuation thereof, a fluid circuit having a source of fluid pressure for the flow of fluid therethrough and having an inlet and outlet restrictions therein, said pressure responsive member communicating with said circuit at a point between said two restrictions, one of said restrictions comprising valve means including a movable valve portion to control the restrictive effect of said one restriction for establishing the pressure between said two restrictions acting on said pressure responsive member, sensing means responsive to changes in the speed of said machine to produce forces acting on said valve portion for effecting speed-regulating movements of said pressure responsive member and said control means, and said other restriction comprising second valve means operatively connected to said control means to decrease the restrictive effect of said other restriction as said control means moves in a reduce-speed direction, and conversely.

10. In a control device for regulating the speed of an engine having control means therefor, the combination of means to effect speed-regulating movements of said control means comprising, a pressure responsive member operatively connected to said control means for actuation thereof, a fluid circuit having a source of fluid pressure for the flow of fluid therethrough and having inlet and outlet restrictions therein, said circuit at a point between said two restrictions communicating with said pressure responsive member on only one side thereof, one of said restrictions comprising valve means including a movable valve portion to vary the restrictive effect of said one restriction for establishing the pressure between said two restrictions acting only on said one side of said pressure responsive member, biasing means acting on said pressure responsive member and said control means to oppose the forces produced by said last-named pressure, sensing means responsive to changes in the speed of said engine to produce forces acting on said valve portion for effecting speed-regulating movements of said pressure responsive member and said other restriction comprising said control means, and second valve means including a movable valve element operatively connected to said control means to control the restrictive effect of said other restriction in accordance with changes in the position of said control means.

11. In a control device for regulating the speed of an engine having control means therefor, the combination of means to effect speed-regulating movements of said control means comprising, a pressure responsive member operatively connected to said control means for actuation thereof, a fluid circuit having a source of fluid pressure for the flow of fluid therethrough and having inlet and outlet restrictions therein, said pressure responsive member communicating with said circuit at a point between said two restrictions, one of said restrictions comprising valve means including a movable valve portion to control the restrictive effect of said one restriction for establishing the pressure between said two restrictions acting on said pressure responsive member, sensing means responsive to changes in the speed of said engine to produce forces acting on said valve portion for effecting speed-regulating movements of said pressure responsive member and said control means, said other restriction comprising second valve means including a movable valve element operatively connected to said control means to control the restrictive effect of said other restriction in accordance with changes in the position of said control means, and said valve means including substantially frictionless swingable leaf spring means imparting rigidity in one direction acting to support said valve portion for frictionless movements by maintaining said valve portion suspended within the fluid controlled thereby completely free of surface contact other than fluid contact during operational movements thereof.

12. In a control device for regulating the speed of a rotating machine having control means therefor, the combination of means to effect speed-regulating movements of said control means comprising, a pressure responsive member operatively connected to said control means for actuation thereof, a fluid circuit having a source of fluid pressure for the flow of fluid therethrough and having inlet and outlet restrictions therein, said pressure responsive member communicating with said circuit at a point between said two restrictions, one of said restrictions comprising valve means including swingable frictionless leaf spring means having a valve portion to control the restrictive effect of said one restriction for establishing the pressure between said two restrictions acting on said pressure responsive member, sensing means responsive to changes in the speed of said machine to produce forces acting on said valve portion for effecting speed-regulating movements of said pressure responsive member and said control means, and said other restriction comprising second valve means including a movable valve element to vary the restrictive effect of said other restriction in accordance with changes in the position of said control means.

13. In a control device for regulating the speed of an automotive vehicle including an internal combustion engine having an intake passage for the flow of air therethrough, a throttle operatively mounted in said passage whereby closure of said throttle increases the vacuum in siad passage on the downstream side of the throttle and conversely, said vehicle having brake actuating means, the combination of means to effect vehicle speed controlling movements of said throttle comprising, a pressure responsive member operatively connected to said throttle for actuation thereof by at least a portion of said intake vacuum in a direction to increase vehicle speed, biasing means acting on said pressure responsive member and said throttle in a direction to reduce vehicle speed, a vacuum circuit for the flow of air therethrough and having inlet and outlet restrictions therein, said circuit communicating with said pressure responsive member on one side thereof at a point between said two restrictions and having its outlet communicating with said intake passage on the downstream side of said throttle, said inlet restriction comprising valve means including swingable frictionless leaf spring means having a movable valve portion to vary the restrictive effect of said inlet restriction independent of said outlet restriction for controlling said vacuum portion acting on said pressure responsive member to effect movement thereof, sensing means responsive to changes in the speed of said vehicle to produce forces acting on said valve portion for effecting speed-regulating movements of said pressure responsive member and cooperating throttle, said outlet restriction including a portion exposed to said intake passage vacuum to preclude said passage vacuum from acting directly on said valve portion, and means operated by said brake-actuating means upon normal movements thereof to cause inactivation of said device with respect to said throttle.

14. In a speed control device for an automotive vehicle including an engine having control means therefor normally advanced to increase vehicle-speed, and conversely, the combination of, a regulator mechanism for effecting automatic regulating movements of said control means in a direction tending to maintain a preselected vehicle speed, said regulator mechanism including a pressure responsive member operatively connected to said control means for transmitting forces thereto for effecting said speed-regulating movements thereof, a fluid circuit having a flow of fluid therethrough and communicating with said pressure responsive member, valve means in said circuit for controlling fluid pressure therein acting on said pressure responsive member for effecting said movements thereof, sensing means responsive to changes in a signal accompanying a change in vehicle speed to produce forces acting on said valve means for effecting said speed-regulating movements of said control means, second valve means in said circuit including a movable valve element operatively connected to said control means tending to vary said pressure acting on said pressure responsive member in accordance with changes in the position of said control means, and automatic activating means operated automatically in response to advancement of said control means to cause activation of said pressure responsive member with respect to said control means only after said advancement thereof by the vehicle-driver.

15. In a speed control device for an automotive vehicle including an engine having control means therefor normally advanced to increase vehicle-speed, and conversely and including vehicle brake-actuating means, the combination of, means for effecting automatic regulating movements of said control means in a direction tending to maintain a preselected vehicle speed comprising, a pressure responsive member operatively connected to said control means for effecting said speed-regulating movements thereof, a fluid circuit having a flow of fluid therethrough and communicating with said pressure responsive member, valve means in said circuit for controlling fluid pressure therein acting on said pressure responsive member for effecting said movements thereof, sensing means responsive to changes in a signal accompanying a change in vehicle speed to produce forces acting on said valve means for effecting said speed-regulating movements of said control means, second valve means in said circuit including a movable valve element operatively connected to said control means tending to vary said pressure acting on said pressure responsive member in accordance with changes in the position of said control means, release means operated by said brake-actuating means upon normal movements thereof for temporarily rendering said regulator mechanism inactive but not inoperative to transmit said forces to said control means, activating means operatively associated with said mechanism and selectively operable by the vehicle-driver solely at his discretion to effect activation of said mechanism with respect to said control means only after advancement thereof by the vehicle-driver, said selective activation being effected at a vehicle speed substantially lower than said preselected speed, and said regulator mechanism being constructed and arranged to cause automatic acceleration of the vehicle from said lower speed to said preselected speed and tending automatically to maintain said preselected regulated speed thereafter.

16. In a control device for regulating the speed of an automotive vehicle including an internal combustion engine having an intake passage for the flow of air therethrough, a throttle operatively mounted in said passage whereby a reduction of the opening of said throttle increases the vacuum in said passage on the downstream side of the throttle and conversely, said vehicle having brake-actuating means, the combination of; a pressure-responsive member operatively connected to said throttle for actuation thereof, lost-motion means operatively connected to said pressure-responsive member and said throttle to effect said operative connection thereof, a vacuum circuit for the flow of air therethrough and having inlet and outlet restrictions therein, said circuit communicating with said pressure responsive member on one side thereof at a point between said two restrictions and having its outlet communicating with said intake passage on the downstream side of said throttle, said inlet restriction including valve means for controlling vacuum in said circuit acting only on said one side of said pressure responsive member for effecting movements thereof in a direction to open said throttle, biasing means acting on said pressure responsive member in a direction tending to close said throttle to oppose the forces produced by said last-named vacuum, said valve means including a movable valve portion to vary the restrictive effect of only said inlet restriction for modulating said vacuum acting on said pressure responsive member to cause regulating movements thereof, said outlet restriction including a portion exposed to said varying vacuum in said intake passage to preclude said passage vacuum from acting on said valve portion during speed regulating operation of said device, release means operated by said brake-actuating means upon normal movements thereof to render said regulating device inactive with respect to said throttle, and sensing means responsive to changes in the speed of said vehicle to produce forces acting on said valve means for effecting said speed-regulating movements thereof and of said pressure-responsive member and said throttle.

17. In a control device for regulating the speed of an automotive vehicle including an internal combustion engine having an intake passage for the flow of air therethrough, a throttle operatively mounted in said passage whereby a reduction of the opening of said throttle progressively increase the vacuum in said passage on the downstream side of the throttle and conversely, said vehicle having brake-actuating means, the combination of; a pressure responsive member operatively connected to said throttle for actuation thereof, a vacuum circuit for the flow of air therethrough and having inlet and outlet restrictions therein, said circuit communicating with said pressure-responsive member on one side thereof at a point between said two restrictions and having its outlet communicating with said intake passage on the downstream side of said throttle, said inlet restriction including valve means for controlling vacuum in said circuit acting only on said one side of said pressure-responsive member for effecting movements thereof in a direction to open said throttle, biasing means acting on said pressure-responsive member in a direction tending to close said throttle to oppose the forces produced by the last-named vacuum, said valve means including a portion movable entirely independent of said outlet restriction to vary the restrictive effect of said inlet restriction for modulating said vacuum acting on said pressure-responsive member to cause regulating movements thereof, said outlet restriction including a portion exposed to said varying vacuum in said intake passage to preclude said passage vacuum from acting on said valve portion during said speed-regulating operation of said device, release means operated by said brake-actuating means upon normal movements thereof to render said regulating device inactive with respect to said throttle, and sensing means responsive to changes in the speed of said vehicle to produce forces acting on said valve means for causing said regulating movements thereof for effecting speed-regulating movements of said throttle, the aperture of said outlet restriction being independent of speed-responsive movement of said valve portion.

18. In a control device for regulating the speed of an automotive vehicle including an internal combustion engine having an intake passage for the flow of air therethrough, a throttle operatively mounted in said passage whereby a reduction of the opening of said throttle progressively increases the vacuum in said passage on the downstream side of the throttle and conversely, said vehicle having brake-actuating means, the combination of; a pressure-responsive member operatively connected to said throttle for actuation thereof, a vacuum circuit for the flow of air therethrough and having inlet and outlet restrictions therein, said circuit communicating with said pressure-responsive member on one side thereof at a point between said two restrictions and having its outlet communicating with said intake passage on the downstream side of said throttle, said inlet restriction including valve means for controlling vacuum in said circuit acting only on said one side of said pressure-responsive member for effecting movements thereof in a direction to open said throttle, biasing means acting on said pressure responsive member in a direction tending to close said throttle to oppose the forces produced by said last-named vacuum, said valve means including a portion movable independent of said outlet restriction to vary the restrictive effect of said inlet restriction for modulating said vacuum acting on said pressure responsive member to cause regulating movements thereof, said outlet restriction including a portion exposed to said varying vacuum in said intake passage to preclude said passage vacuum from acting on said valve portion during speed-regulating operation of said device, release means operated by said brake-actuating means upon normal movements thereof to render said regulating device inactive with respect to said throttle, and sensing means responsive to changes in the speed of said vehicle to produce forces acting on said valve means for decreasing the restrictive effect of said inlet restriction by increasing its aperture when said vehicle speed increases to decrease said modulated vacuum acting on said pressure-responsive member for enabling said biasing means to retard said throttle, and conversely, for effecting speed-regulating movements of said pressure-responsive member and said throttle.

19. The combination of elements defined in claim 18, and said valve means including substantially frictionless swingable leaf spring means imparting rigidity in one direction acting to support said valve portion for frictionless movements by maintaining said valve portion suspended within the air controlled thereby completely free of surface contact other than air contact during operational movements thereof.

20. The combination of means defined in claim 18, and said throttle being operable by the vehicle-driver in a manner in which the speed is increased by advancement of the throttle, and conversely, said release means operated by said brake-actuating means upon normal movements thereof being adapted to temporarily inactivate said regulating device with respect to said throttle without rendering same inoperative, automatic activating means operatively associated with said device and operated in response to movement of said throttle upon advancement thereof to automatically effect activation of said device with respect to said throttle after said advancement thereof by the vehicle-driver, said activating means including pressure responsive means controlled by said passage vacuum when same reduces as a result of said advancement of said throttle to effect said automatic activation of said device, and said regulator mechanism being adapted to cause automatic acceleration of the vehicle from said lower speed to said regulated speed and tending automatically to maintain said preselected regulated speed thereafter.

21. The combination of means defined in claim 18, and said device regulates the speed of the vehicle at a preselected value, and said vehicle including an element manually movable by the vehicle-driver incident to normal operation of the vehicle, said release means when operated by said brake-actuating means upon normal movements thereof being adapted to temporarily render said regulator device inactive but not inoperative, activating means operable selectively by the vehicle-driver independent of the preselected speed of the vehicle to cause immediate activation of said device with respect to said throttle entirely at the discretion of said driver irrespective of the preselected vehicle speed, said regulator device upon said activation being constructed and arranged to cause automatic acceleration of the vehicle from the speed at which said activation occurs to said preselected regulated speed and tending automatically to maintain said regulated speed thereafter, and said biasing means providing a predetermined minimum force for preventing the passage vacuum from falling below a minimum value whenever said throttle tends to open during said automatic acceleration and in which further opening of said throttle during said automatic acceleration reduces said intake passage vacuum acting on said pressure-responsive member which causes the throttle to retard until the vacuum acting on said pressure-responsive member is restored to said minimum value, and conversely, for restricting the rate of said automatic acceleration, and restraining means operable in response to operation of said element to render said device inoperative.

22. The combination of means defined in claim 18, in which said movable portion is exposed to said modulated vacuum, and in which said biasing means comprises spring means, and second spring means acting on said valve means to bias said speed-sensing forces for establishing the operating positions of said valve portion, and said elements and means being constructed and arranged to affect the position of said valve means as a result of changes in said modulated vacuum acting thereon to enable said decrease of said modulated vacuum when said vehicle speed increases to cause additional movement of said valve portion in a direction to decrease said restrictive effect further by increasing said aperture further, for reducing the speed droop of said engine, and conversely.

23. The combination of means defined in claim 18, and said vehicle including an element manually movable by the vehicle-driver incident to normal operation of the vehicle, and restraining means operable in response to operation of said element to render said device inoperative, second valve means operatively associated with said restraining means and with said circuit and activated as a result of operation of said element to reduce the vacuum transmitted to said pressure responsive member for precluding operation thereof, and means operatively associated with said restraining means and operable entirely at the discretion of said driver irrespective of vehicle speed to cause operation of said second valve means for activating said device.

24. The combination of means defined in claim 18, and said release means operated by said brake-actuating means upon normal movements thereof being adapted to temporarily inactivate said regulating device with respect to said throttle without rendering same inoperative, and second valve means operatively associated with said vacuum circuit and operated by said release means upon said normal movements thereof to reduce the vacuum transmitted to said pressure-responsive member for precluding operation thereof to cause said temporary inactivation of said device, and conversely, automatic activating means operatively associated with said second valve means and operated selectively by the vehicle-driver entirely at his discretion at a vehicle speed less than a preselected regulated speed to cause operation of said second valve means for activating said device with respect to said throttle, and said regulator mechanism being adapted to cause automatic acceleration of the vehicle from said lower speed to said regulated speed and tending automatically to maintain said preselected regulated speed thereafter.

25. In a control device for regulating the speed of an automotive vehicle including an internal combustion engine having an intake passage for the flow of air therethrough, a throttle operatively mounted in said passage whereby a reduction of the opening of said throttle progressively increases the vacuum in said passage on the downstream side of the throttle and conversely, and said throttle being operable by the vehicle-driver in a manner in which speed is increased by advancing the throttle, said vehicle having brake-actuating means, the combination of; a pressure-responsive member operatively connected to said throttle for actuation thereof, a vacuum circuit for the flow of air therethrough and having inlet and outlet restrictions therein, said circuit communicating with said pressure-responsive member on one side thereof at a point between said two restrictions and having its outlet communicating with said intake passage on the downstream side of said throttle, said inlet restriction including valve means for controlling vacuum in said circuit acting only on said one side of said pressure-responsive member for effecting movements thereof in a direction to open said throttle, biasing means acting on said pressure-responsive member in a direction tending to close said throttle to oppose the forces produced by said last-named vacuum, said valve means including a portion movable entirely independent of said outlet restriction to vary the restrictive effect of said inlet restriction for modulating said vacuum acting on said pressure-responsive member to cause regulating movements thereof, said outlet restriction including a portion exposed to said varying vacuum in said intake passage to preclude said passage vacuum from acting on said valve portion during speed-regulating operation of said device, release means operated by said brake-actuating means upon normal movements thereof to temporarily inactivate said regulating device with respect to said throttle without rendering same inoperative, automatic activating means operated in response to advancing movements of said throttle to automatically effect activation of said device with respect to said throttle, lost-motion means operatively associated with said pressure-responsive member and said throttle to effect said operative connection thereof, and sensing means responsive to changes in the speed of said vehicle to produce forces acting on said valve means for decreasing the restrictive effect of said inlet restriction by increasing its aperture when said vehicle speed increases, and conversely, for effecting speed-regulating movements of said pressure-responsive member and said throttle.

26. In a control device for regulating the speed of an automotive vehicle including an engine having control means therefor adapted to be advanced to increase vehicle speed, and conversely, and said vehicle having brake-actuating means, a source of fluid pressure varying as a function of the position of said control means, a pressure-responsive member operatively connected to said control means for actuation thereof, a fluid circuit having inlet and outlet restrictions therein and communicating at one end thereof with said varying source pressure to induce a flow of fluid through the circuit, said circuit communicating with said pressure-responsive member on one side thereof at a point between said two restrictions, a first of said two restrictions including valve means for controlling pressure in said circuit acting on said one side of said pressure-responsive member for causing regulating movements thereof, biasing means acting on said pressure responsive member to oppose the forces produced by said last-named pressure, said valve means including a portion movable independent of the second of said two restrictions to vary the restrictive effect of said first restriction for modulating said pressure acting on said pressure-responsive member to cause regulating movements thereof, said second restriction including a portion exposed to said varying source pressure to preclude same from acting on said valve portion during speed-regulating operation of said device, said pressure-responsive member and said biasing means being constructed and arranged to cause movement of said control means in response to an increase in said varying source pressure at instantaneous fixed positions of said valve portion in a direction to reduce said source pressure, and conversely, release means operated by said brake-actuating means upon normal movements thereof to render said regulating device inactive with respect to said control means, and sensing means responsive to changes in the speed of said vehicle to produce forces acting on said valve means for causing said regulating movements thereof to effect speed-regulating movements of said control means.

References Cited

UNITED STATES PATENTS

| | | | |
|---|---|---|---|
| 2,243,354 | 5/1941 | Musser | 180—82.1 X |
| 2,367,606 | 1/1945 | Olson | 180—82.1 X |
| 2,458,424 | 1/1949 | Reynoldson | 180—82.1 |
| 2,671,542 | 3/1954 | Robnett | 192—3 |
| 2,737,165 | 3/1956 | Thorner | 123—103 |
| 2,782,025 | 2/1957 | Olson. | |
| 2,835,237 | 5/1958 | Thorner | 123—102 |
| 2,910,974 | 11/1959 | Caris | 123—103 |
| 2,942,680 | 6/1960 | Miller et al. | 180—82 |
| 2,990,825 | 7/1961 | Fuller et al. | 180—82.1 X |
| 3,021,827 | 2/1962 | Brunner | 123—103 |
| 3,059,715 | 10/1962 | Lopez | 180—77 |
| 3,068,849 | 12/1962 | Thorner | 180—82.1 X |
| 3,084,758 | 4/1963 | Thorner | 180—82.1 |

KENNETH H. BETTS, *Primary Examiner.*